United States Patent [19]

Suzuki et al.

[11] 4,228,577

[45] Oct. 21, 1980

[54] METHOD OF MAKING ROTARY TYPE WHEELS

[75] Inventors: Takami Suzuki; Nobuo Iwata; Masami Tsunasawa, all of Tokyo, Japan

[73] Assignee: Ricoh Company, Ltd., Tokyo, Japan

[21] Appl. No.: 939,948

[22] Filed: Sep. 6, 1978

Related U.S. Application Data

[62] Division of Ser. No. 722,243, Sep. 10, 1976, Pat. No. 4,126,400.

[30] Foreign Application Priority Data

Sep. 12, 1975 [JP] Japan ............................ 50-109978

[51] Int. Cl.$^3$ .............................................. B23P 17/00
[52] U.S. Cl. ...................................... 29/418; 29/458; 264/277
[58] Field of Search ............... 29/418, 458; 400/144.2, 400/144.3; 264/277, 278

[56] References Cited

U.S. PATENT DOCUMENTS

| | | | |
|---|---|---|---|
| 3,224,076 | 12/1965 | Johnson et al. | 264/277 X |
| 3,505,437 | 4/1970 | Eichmann et al. | 264/277 X |
| 3,859,712 | 1/1975 | Tramposch | 29/418 |
| 3,921,277 | 11/1975 | Tramposch | 29/418 |
| 4,018,639 | 4/1977 | Staples | 29/418 X |

Primary Examiner—Charlie T. Moon
Attorney, Agent, or Firm—Jordan and Hamburg

[57] ABSTRACT

Resilient tongues project from a central hub and carry two or more type members. The hub is rotated to a position in which the tongue carrying the desired type member is in a printing position facing a paper supporting platen. The hub is then shifted along the axis of the selected tongue so that the required type member is in a printing position. A drive motor for rotating the hub is connected to the hub by a universal joint to compensate for the shifting of the hub. The universal joint comprises a biased presser member to eliminate lost motion in the rotational direction. A stopper member is provided so that the bending characteristics of the selected tongue are the same no matter which type member is selected. A hammer drives the type member against the paper to print. The resilient tongues are formed of a thermoplastic resin mixed with glass or carbon fibers and the type members may be formed separately from the tongues, fixed thereto and plated with metal. The hub may be formed in two or more sections, with each section carrying some of the resilient tongues. The tongues are bent in such a manner that all of the type members lie in a common plane. The angles between the type members and the tongues are selected in such a manner that all of the type members strike the paper perpendicular to the platen.

3 Claims, 24 Drawing Figures

METHOD OF MAKING ROTARY TYPE WHEELS

This is a division of application Ser. No. 722,243, filed Sept. 10, 1976, now U.S. Pat. No. 4,126,400, issued Nov. 21, 1978.

The present invention relates to a serial printing apparatus comprising a printing member having a hub supporting resilient tongues which carry type members.

In the type of serial printer disclosed in U.S. Pat. No. 3,707,214 to Ponzano, a type wheel comprises a rotary hub. Resilient tongues extend radially from hub and carry type members at their ends, one on each tongue. The hub is rotated until the tongue carrying the type member formed with the desired character for printing is in a printing position facing a platen which supports paper. A hammer then drives the type member against the paper through an inked ribbon to print the character on the paper resiliently deforming the tongue in the process. Such an apparatus is highly advantageous compared to a ball, cylinder or multihead printer in that the tongue and type member are very light, and can be moved faster, with less noise and smaller energy. A printing apparatus of this type can reduce the noise level from between 75 to 85 phones which are common to printers of other types down to below 70 phones.

Whereas the apparatus disclosed by Ponzano is adequate in applications where the number of characters required for printing is low, for example the numerals 0 to 9 and a few symbols, for upper and lower case alphabet in addition to numerals and punctuation marks required in a standard typewriter, the length of the tongues must be increased to an impractical value to accommodate all of the characters. If the sizes of the type members and tongues are reduced to provide a more compact configuration, the rigidity of the apparatus will not be sufficient for practical use. This prior art apparatus is completely insufficient if a printing apparatus which must include the Japanese Katakana characters (about 50 in number) in addition to the Roman alphabet is required.

The apparatus may be operated in either of two ways. The hub may be rotated continuously and sensor means provided to actuate the hammer when the required tongue is in the printing position. In this case, the hammer holds the type member against the paper momentarily for printing while the hub continues to rotate. The tongue must therefore bend both toward the paper and in the rotary direction of the tongue. Spring metal tongues do not readily allow such bending in the rotational direction and introduce unacceptable vibration into the apparatus.

Alternatively, the hub may be rotated to the printing position by a stepping motor and stopped. In this case, the tongue is stationary when the hammer moves it, and is not required to bend in the rotary direction. On the contrary, the tongues must be rigid in the rotational direction to withstand the extreme acceleration and deceleration and not oscillate around the stopping point. In prior art apparatus, such rigid tongues have a high moment of inertia which limits the operational speed of the apparatus.

The same problem affects the durability of the type members. Whereas metal type members are extremely durable, they are heavy and limit the operational speed of the apparatus as discussed above. Integral tongues and type members formed of metal do not have sufficient elasticity. If an integral tongue and type member is formed of a thermoplastic resin to provide elasticity, the service life of the type member will only be 1,000,000 to 3,000,000 cycles. Whereas a type member formed of a thermosetting resin such as epoxy provides a service life of 10,000,000 to 20,000,000 cycles, a thermosetting resin cannot be used for the tongues since it is rigid. Due to the hygroscopic properties of thermoplastic and thermosetting resins, whereas thermosetting resins may be metal plated, the service life of thermoplastic resins except for special formulas such as TYPE 66 NYLON (trade name) thermoplastic cannot be increased by metal plating.

It is therefore an object of the present invention to provide a serial printing apparatus by which the number of type members available for practical use may be increased over the prior art.

It is another object of the present invention to provide a serial printing apparatus in which two or more type members are provided on each tongue.

It is another object of the present invention to provide a serial printing apparatus comprising two or more hubs supporting tongues and type members, the tongues being bent in such a manner that the type members lie in a common plane in their free state.

It is another object of the present invention to provide a serial printing apparatus in which a hub carrying tongues is both rotated and shifted to select a desired type member, the means for rotating the hub being connected to the hub through a universal joint which compensates for the shifting of the hub and comprises biasing means to prevent lost motion in the rotational direction.

It is another object of the present invention to provide a serial printing apparatus which comprises tongues formed off a thermoplastic resin containing glass or carbon fibers and type members formed of a thermosetting resin.

The above and other objects, features and advantages of the present invention will become clear from the following detailed description taken with the accompanying drawings, in which.

Figure 1:
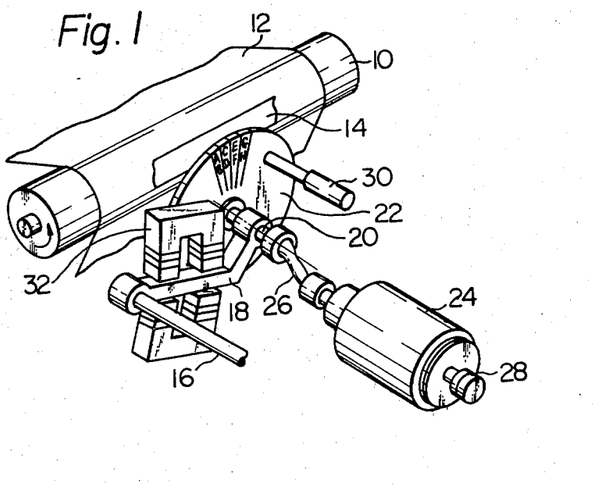
FIG. 1 is a plan view of a serial printing apparatus embodying the present invention.

Referring now to FIG. 1, a serial printing apparatus embodying the present invention comprises a rotary platen 10 which supports a paper 12 on which information is to be printed by the apparatus. An inked ribbon 14 is located in front of the paper 12. A carriage which is not shown supports a shaft 16 which rotatably supports an arm 18. The arm 18 rotatably carries at its end a shaft 20 to which is fixed a type wheel 22. The carriage also supports a rotary drive motor 24, which is connected to the shaft 20 by a universal joint 26. As will be described below, a sensor device 28 is provided to control the motor 24. A hammer 30 is movable with the carriage and is actuated by a mechanism which is not shown. An electromagnet 32 is also movable with the carriage to rotate the arm 18 about the shaft 16 as desired.

Figure 2:
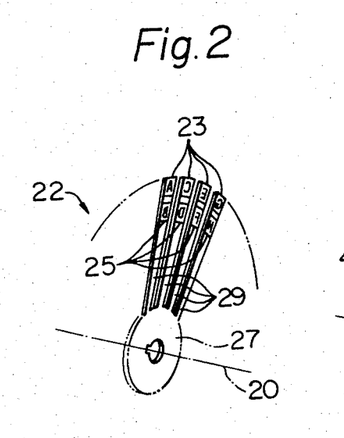
FIG. 2 is a fragmentary plan view of a type wheel for the apparatus shown in FIG. 1.

Refferring now to FIG. 2, the type wheel 22 comprises a rotary hub 27 which is fixed to the shaft 20. Resilient tongues 29 extend radially from the hub 27 and carry radially inner type members 25 and radially outer type members 23. The type members 23 and 25 are formed with type faces to print characters. In a typical application, the inner type members 25 may be formed with the upper case Roman alphabet characters and the outer type members 23 may be formed with the lower case Roman alphabet characters. The resilient tongues may be formed of a thermoplastic resin containing glass or carbon fibers.

In operation, the carriage is moved along the axis of the platen 10 by a carriage drive means (not shown) so that the shaft 16, arm 18, electromagnet 32, shaft 20, type wheel 22, motor 24, universal joint 26, sensor device 28 and hammer 30 are moved as a unit. The carriage is stopped at each printing position to print a character. In an application in which the motor 24 is a stepping motor or a servomotor, a character to be printed is selected by a keyboard (not shown) or similar device which sends a rotational signal to the motor 24 and a shift signal to the electromagnet 32. The motor 24 utilizing the sensor device 28 rotates the shaft 20 until the tongue 29 containing the type member with the selected character is in an angular printing position adjacent to the ribbon 14. The electromagnet 32 is energized to attract and rotate the arm 18, shaft 20, and type wheel 22 so that the desired type member 23 or 25 on the selected tongue 29 is in a linear printing position (If the length of the arm 18 is long compared with the spacing between the type members 23 and 25, this movement of the shaft 20 is approximately linear). The hammer 30 is then actuated to drive the selected type member 23 or 25 against the inked ribbon 14 and paper 12 to print the character on the paper 12. It will be noticed that the selected tongue 29 is resiliently bent toward the paper 12 during this process.

The apparatus may be operated in another manner. The motor 24 may be rotated at constant speed and the hammer 30 actuated when the sensor device 28 senses that the selected tongue 29 is in the printing position. In this case, the hammer 30 holds the type member 23 or 25 against the ribbon 14 for a short time so that the tongue 29 must deflect in the rotational direction of the type wheel 22. It will be appreciated that more than two type members may be provided on each tongue, and that the electromagnet 32 or any other shifting means such as a mechanical device may operate directly on the shaft 20 to linearly move the same.

Figure 3:
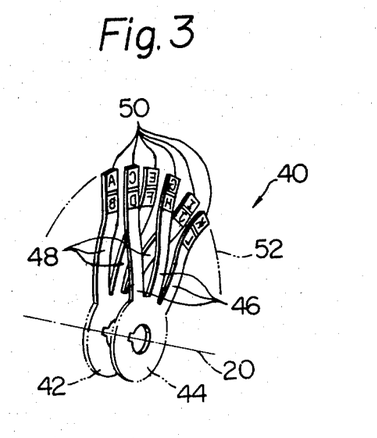
FIG. 3 is similar to FIG. 2 but shows another type wheel.

FIG. 3 shows an alternative embodiment of the type wheel 22. In this case a type wheel 40 comprises two hubs 42 and 44 which are fixed to the shaft 20. Resilient tongues 46 radially extend from the hub 44 and resilient tongues 48 radially extend from the hub 42. Type members which are all designated as 50 are provided on the tongues 46 and 48 so that they all lie in a plane 52 which is perpendicular to the axis of the shaft 20. The type wheel 40 is used in the same manner as the type wheel 22.

Figure 4:
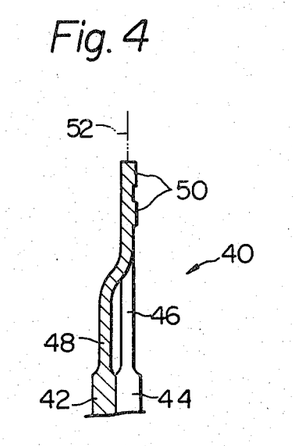
FIG. 4 is a cross section of the type wheel shown in FIG. 3.

The type wheel 40 is shown in cross section in FIG. 4. In the particular form illustrated, the tongues 46 are straight whereas the tongues 48 are bent in a generally Z-shape. The axes of the tongues 46 and 48 are considered to lie in the plane 52 and pass through the axis of the shaft 20. If desired, both of the tongues 46 and 48 may be bent.

Figure 5:
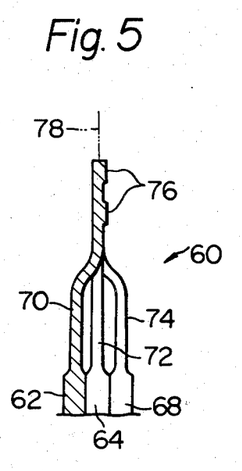
FIG. 5 is a cross section of a modified type wheel.

If desired, more than two hubs may be provided for a type wheel. As shown in FIG. 5, a type wheel 60 comprises hubs 62, 64 and 68 from which resilient tongues 70, 72 and 74 respectively radially extend. Type members 76 are fixed to the tongues 70, 72 and 74. In this embodiment, the tongues 72 are straight whereas the tongues 70 and 74 are bent toward a common plane 78 so that all of the type members 76 lie in the common plane 78. Thus, it is to be noticed that the type wheel provided with two or more hubs makes it possible to reduce the diameter of the type wheel without reducing the width of each tongue or to increase the number of the tongues, so that the inertia moment of the type wheel can be reduced without reducing the rigidity of the tongues and the type wheel can be rotated at a further increased speed.

Figure 6:
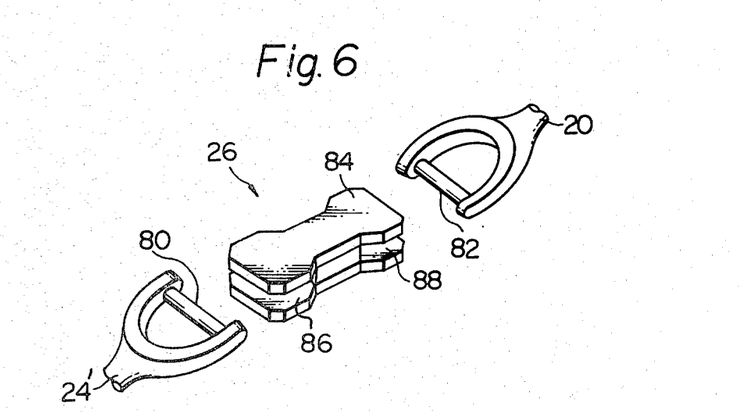
FIG. 6 is an exploded view of a universal joint for the apparatus shown in FIG. 1.
Figure 7:
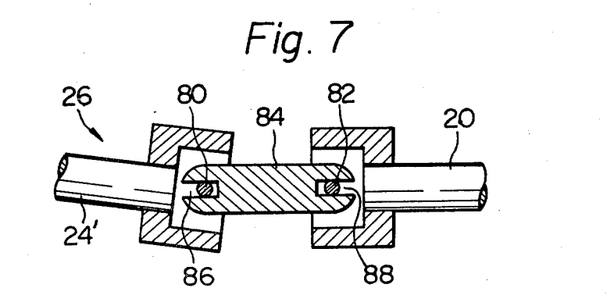
FIG. 7 is a sectional view of a universal joint similar to that shown in FIG. 6.

A first embodiment of the universal joint 26 is shown in FIG. 6, and comprises a transverse pin 80 connected to a bifurcated end of a shaft 24' of the motor 24. A similar pin 82 is connected to a bifurcated end of the shaft 20. A link 84 is provided with slots 86 and 88 in which the pins 80 and 82 respectively are slidably received. The universal joint 26 thereby rotatably connects the pins 80 and 82 and shafts 24' and 20 together and allows the shaft 20 to be moved in its shifting direction since the pins 80 and 82 can slide in the slots 86 and 88 in the direction of the axis of the link 84. The universal joint 26 is shown in cross section in FIG. 7, and is modified in the respect that the pins 80 and 82 are connected to tubular ends rather than bifurcated ends of the shafts 24' and 20.

Figure 8:
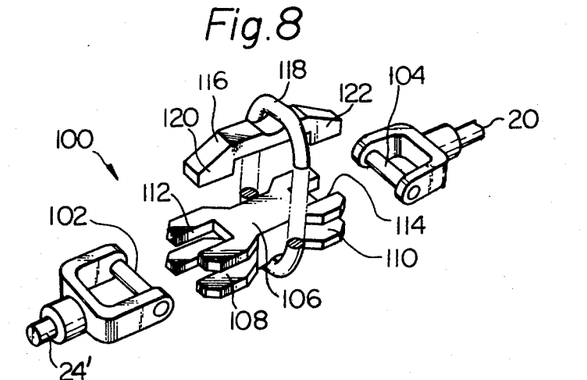
FIG. 8 is an exploded view of another universal joint.
Figure 9:
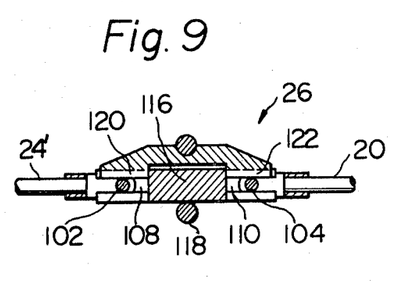
FIG. 9 is a cross section of the universal joint shown in FIG. 8.
Figure 10:
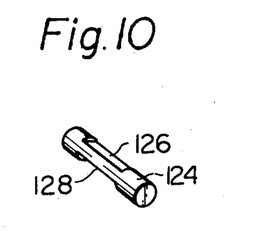
FIG. 10 is a plan view of a pin for the universal joint shown in FIG. 9.

FIG. 8 shows an improvement to the universal joint 26 which is designed to prevent lost motion or backlash in the rotational direction which might be caused by wear of the pins 80 and 82 in the slots 86 and 88. A universal joint 100 comprises pins 102 and 104 connected to bifurcated ends of the shafts 24' and 20 respectively. A link 106 is formed with slots 108 and 110 in which the pins 102 and 104 are slidably received in the same manner as the universal joint 26. The link 106 is, however, formed with slots 112 and 114 which perpendicularly intersect the slots 108 and 110 respectively. A presser member 116 is urged downward by an elastic ring 118 so that arms 120 and 122 of the presser member 116 engage with the pins 102 and 104 respectively and press them against the bottom walls of the slots 108 and 110 respectively. In this manner, even if the pins 102 and 104 wear, the wear will be compensated for by the presser member 116 and elastic ring 118 so that no backlash will exist in the rotational direction of the universal joint 100. The universal joint 100, which is shown in cross section in FIG. 9, may be modified so that the pins 102 and 104 are replaced by pins shaped like a pin 124 which is shown in FIG. 10. In this case, the pins would be rotatably mounted to the shafts 24' and 20. The pin 124 is formed with diametrically opposed flat surfaces 126 and 128 to prevent rotation of the pins in the slots 108 and 110 and thereby reduce the wear on the pins.

Figure 11:
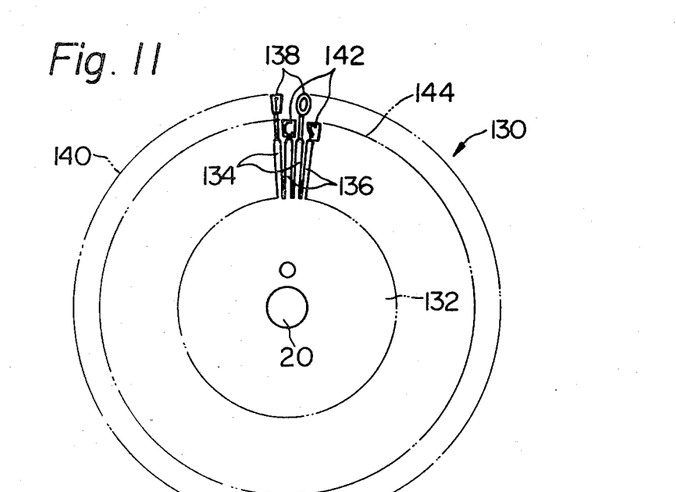
FIG. 11 a fragmentary plan view of another type wheel.

FIG. 11 shows a type wheel 130 which comprises a hub 132 fixed to the shaft 20. Long tongues 134 and short tongues 136 radially extend from the hub 132. Type members 138 are fixed to the long tongues 134 and are arranged along a circle 140. Type members 142 are fixed to the short tongues 136 and lie on a concentric radially inner circle 144. The operation of this type wheel 130 is quite similar to that of the type wheel 22. This type wheel 130 is advantageous for printing on flat surfaces such as passbooks since it overcomes the problem of ghost images. In addition, two or more type wheels 130 may by provided in a way shown in FIGS. 3 and 4 or FIG. 5.

Figure 12A:
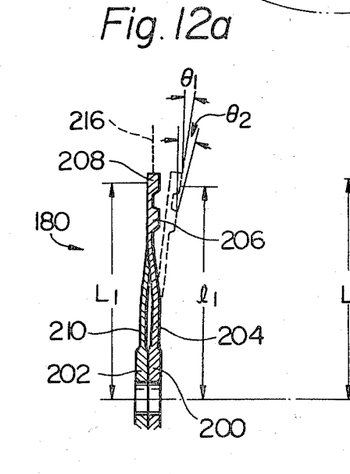
FIG. 12a is a cross section of the type wheel shown in FIG. 4 showing deflection of a rightwardly oriented tongue.
Figure 12B:
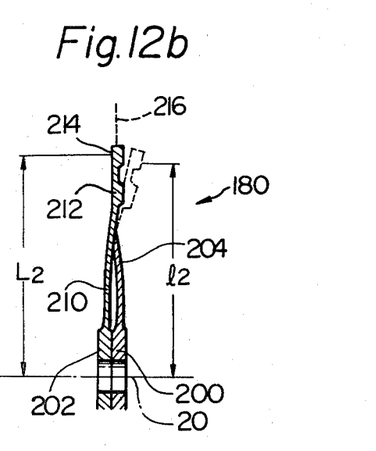
FIG. 12b is similar to FIG. 12a but shows the deflection of a leftwardly oriented tongue.

In FIGS. 12a and 12b, a type wheel 180 comprises a right hub 200 and a left hub 202. Resilient tongues 204 radially extend from the hub 200 and carry radially inner and outer type members 206 and 208. Resilient tongues 210 radially extend from the hub 202 and carry radially inner and outer type members 212 and 214. The tongues 204 and 210 are bent so that all of the type members lie in a common plane 216. Characters are formed on right type faces of the type members as viewed in FIGS. 12a and 12b.

In order for the apparatus to provide optimum printing, it is necessary for the type members to all strike the paper 12 at the same point and that the right type faces thereof be perpendicular to the platen 10 on impact. In FIG. 12a, one of the tongues 204 is shown as bent rightward to a broken line position in which it strikes the paper 12. The distances from the axis of the shaft 20 to the center of the type member 208 in the undeformed and deformed positions are designated as $L_1$ and $l_1$ respectively. The equivalent distances for the type member 214 in FIG. 12b are $L_2$ and $l_2$ respectively. It will be noticed that $L_1$-$l_1$ is less than $L_2$-$l_2$, since the tongue 204 is unbent and the tongue 210 is bent to perform printing. Since $l_1$ must be equal to $l_2$ so that the type members 208 and 214 will strike the paper 12 at the same point, it follows that $L_2$ must be greater than $L_1$. The same relationship holds for the type members 206 and 212.

In order for the type members to all strike the paper 12 at the same angle, an angle $\theta_2$ between the right face of the type member 206 and the plane 216 at the point of impact must be larger than an angle $\theta_1$ between the right face of the type member 208 at the point of impact. In this connection, it is necessary to uniformly apply the same impact to type member through the length and breadth thereof when the type member is driven by the hammer against the paper to print. In order to accomplish this, the type members 208 and 206 are formed in a manner that an angle $\theta_3$ between the back face of the type member 208 and the plane 216 at the point of impact is equal to the angle $\theta_1$, while an angle $\theta_4$ between the back face of the type member 206 and the plane 216 at the point of impact is equal to the angle $\theta_2$, so that the hammer is perpendicular to the back face of the type members 208 or 206 on impact.

Figure 13:
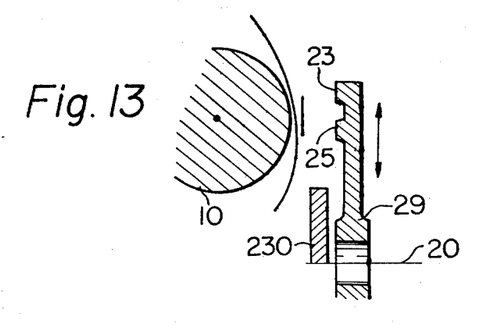
FIG. 13 is a fragmentary view of a modified embodiment of the invention comprising a stopper member.

FIG. 13 teaches the use of a stopper member 230 against which the bottom portion of the selected tongue 29 is abuttable when moved by the hammer 30. The stopper member 230 is employed to provide the same bending characteristics for the tongue 29 no matter which type member 23 or 25 is selected.

Figure 14:
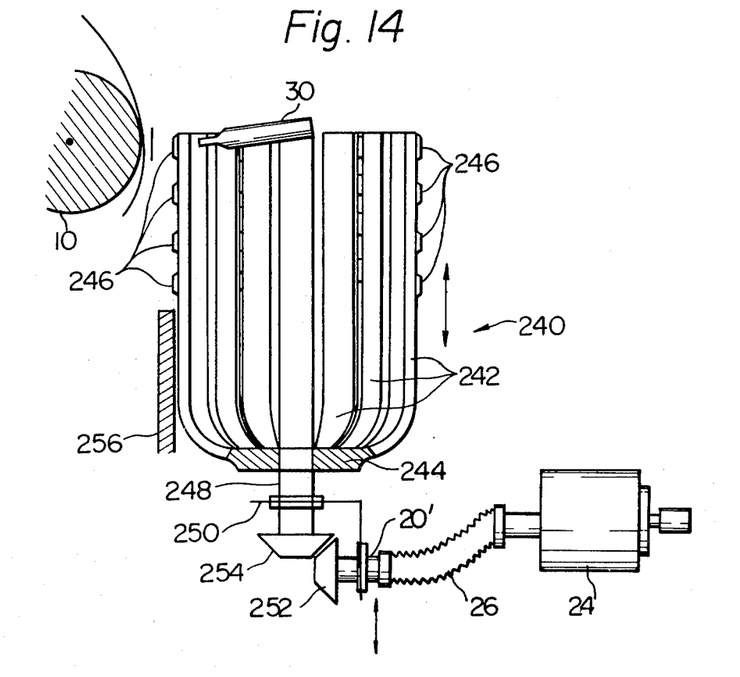
FIG. 14 is similar to FIG. 13 but shows a modified type wheel.

FIG. 14 shows a modified type wheel 240 in which tongues 242 are bent at right angles to a hub 244 to define a cylindrical shape. Type members 246 are fixed to the tongues 242. The hub 244 is fixed to a shaft 248 which is rotatably supported by a carriage member 250 movable with the carriage. The carriage member 250 is movable along the axis of the platen 10 and also vertically to select a desired type member 246 on the selected tongue 242. The shaft 248 and thereby the type wheel 240 are rotatable from the motor 24 by means of the universal joint 26, a shaft 20', and bevel gears 252 and 254. The bevel gear 252 is fixed to the shaft 20' which is rotatably supported by the carriage member 250 and the bevel gear 254 which meshes with the bevel gear 252 is fixed to the shaft 248. A stopper member 256 is provided in the same manner as the stopper member 230.

FIGS. 15 to 18 illustrate the manufacturing process of tongues 300 and type members 302 to produce a type wheel similar to the type wheel 22. All of the type members 302 are integrally cast of thermosetting resin such as epoxy with an annulus 304 which is removed after the type wheel is finished. The type members 302 are provided with a securing means 305 to secure the type members 302 on the tongues 300. The securing means 305 is formed with trapezoidal or wedge-shaped cutouts 306 in such a manner that the tops of the cutouts 306 are larger than the bottoms. The type members 302 may be plated with a metal such as copper, nickel or chromium if desired.

The securing means 305 of the type members 302 are provided with pins 308 which extend downwardly therefrom. The annulus 304 and type members 302 are placed as a unit in a mold (not shown), and means are provided for holding down the type members 302 so that the bottoms of the pins 308 are maintained in contact with the bottom of the mold. In this manner, proper vertical alignment of the type members 302 in the mold is ensured.

After the annulus 304 and type members 302 are positioned in the mold, theremoplastic resin such as amide resin is poured or injected into the mold to form the tongues 300 and a hub (not shown). Preferably the resin is applied under pressure to ensure that the resin will completely fill the trapezoidal or wedge-shaped cutouts 306. After the thermoplastic resin constituting the tongues 300 is solidified, the annulus 304, type members 302, tongues 300 and hub are removed from the mold as a unit and the annulus 304 is cut off to produce the finished type wheel.

Figures 15, 16, 17:
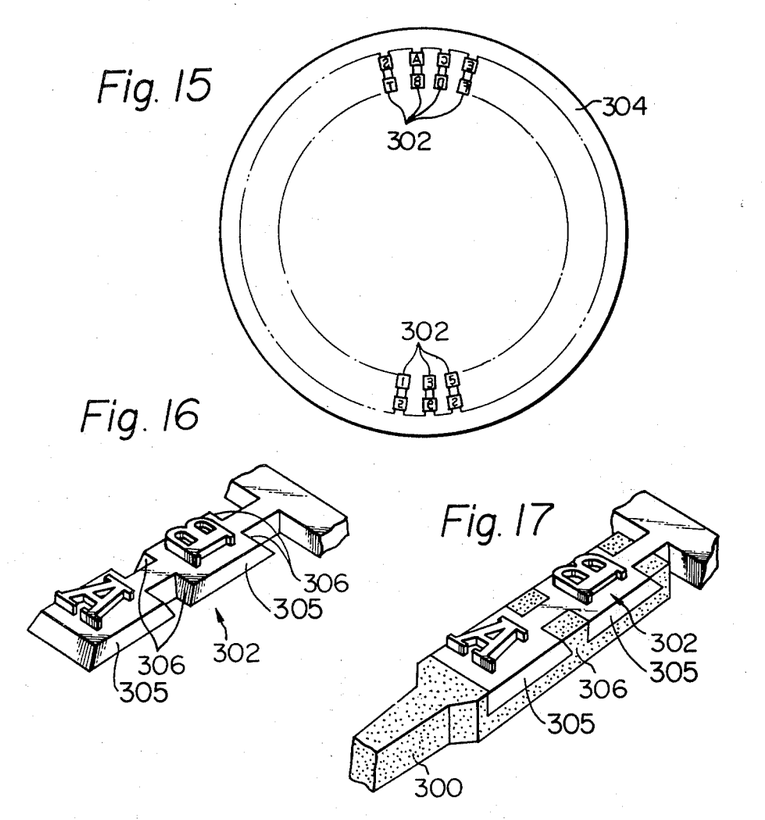
FIG. 15 illustrates the manufacture of a type wheel.
FIG. 16 is a fragmentary plan view of a type member formed as illustrated in FIG. 15.
FIG. 17 is a plan view of the type member of FIG. 16 joined to a tongue.
Figure 18:
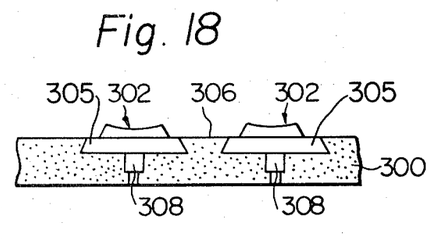
FIG. 18 is a cross section of the type member and tongue shown in FIG. 17.
Figures 19, 20, 21, 22:
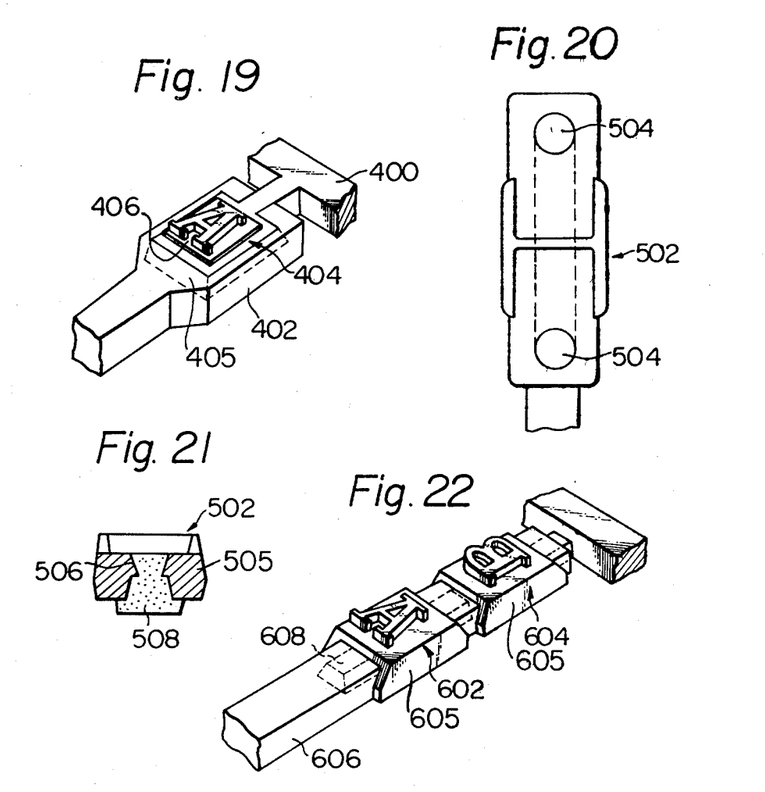
FIG. 19 is similar to FIG. 17 but shows another type member and tongue.
FIG. 20 is an overhead view of another type member and tongue.
FIG. 21 is a cross section of the type member and tongue shown in FIG. 20.
FIG. 22 is a plan view of another type member and tongue in combination with a connector.

FIG. 19 shows an annulus 400, tongue 402, type member 404 and a securing means 405 essentially similar to those shown in FIG. 17. The securing means 405 of the type member 402, however, is formed with a rectangular raised surface 406. The raised surface 406 permits the use of a positioning jig (not shown) having a conjugate recess to position the type member 404 with extreme accuracy in the anguluar direction during the molding process.

FIG. 20 shows a type member 502 on a securing means 505 bearing the character "H" and being formed with pins 504 similar to the pins 308. The securing means 505 of the type member 502 is, however, is formed with an axial opening 506 through which a tongue 508 extends. The opening 506 has a stepped configuration to prevent the type member 502 from coming loose from the tongue 508.

FIG. 22 shows two type members 602 and 604 and securing means 605 similar to the type member 502 as being fixed to a tongue 606. In addition, a connection member 608 is integrally formed with the securing means 605 of the type members 602 and 604 to ensure that the spacing between the type members 602 and 604 will be absolutely precise. As shown, the connecting member 608 is embedded in the tongue 606 to positively hold the type members 602 and 604 on the tongue 606.

Figure 23:
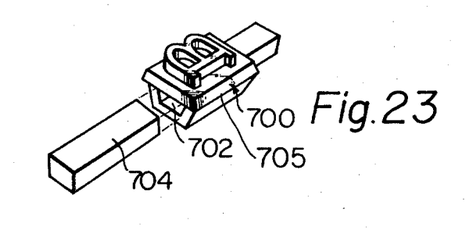
FIG. 23 is a plan view of another type member and tongue.

In FIG. 23 is shown a type member 700 and a securing, means 705 formed with an axial bore 702. A tongue 704 has a cross section conjugate to the bore 702 but dimensions slightly larger so that the securing means 705 of the type member 700 is press-fitted on the tongue 704. In this manner, the type members 700 may be made in only one form for a variety of apparatus in which the spacing between the type members 700 on a single tongue 704 differs for the various apparatus. The type members 700 can be precisely positioned on the tongue 704 by means of a jig or the like (not shown).

Many modifications to the apparatus shown will be possible for those skilled in the art without departing from the scope of the invention after receiving the teachings of the present disclosure.

We claim:

1. A method of making a rotary type wheel comprising the steps of:
    (a) forming an integral molding comprising an annular portion and a plurality of type face members each extending radially inwardly from the radially inner periphery of the annular portion, each type face member comprising a type face and securing means;
    (b) plating the integral molding with a metal;
    (c) positioning the integral molding in a mold;
    (d) molding in the mold a hub and radially outwardly directed tongues corresponding in number to the plurality of type members;
    (e) said molded tongues being molded about said securing means such that the type members are thereby fixedly secured to each tongue; and
    (f) disconnecting the annular portion from the type members.

2. A method of making a rotary type wheel comprising the steps of:
    (a) forming an integral molding comprising an annular portion and a plurality of equiangularly disposed supports each extending radially inwardly from the radially inner periphery of the annular portion, each support incorporating at least one type face accurately positioned with respect to the center of the annular portion;
    (b) plating the integral molding with a metal;
    (c) positioning the integral molding in a mold;
    (d) molding in said mold a hub and radially outwardly directed tongues corresponding in number and angular disposition to the plurality of supports, each of said tongues being molded about a corresponding support such that each support is thereby fixedly secured to each tongue; and
    (e) disconnecting the annular portion from the support.

3. A method of making a rotary type wheel comprising the steps of:
    (a) forming an integral molding comprising an annular portion and a plurality of equiangularly disposed supports each extending radially inwardly from the radially inner periphery of the annular portion, each support incorporating at least one type face accurately positioned with respect to the center of the annular portion;
    (b) positioning the integral molding in a mold;
    (c) molding in said mold a hub and radially outwardly directed tongues corresponding in number and angular disposition to the plurality of supports, each of said tongues being molded about a corresponding support such that each support is thereby fixedly secured to each tongue; and
    (d) disconnecting the annular portion from the support.

* * * * *